United States Patent
Keating (10) Patent No.: US 9,256,450 B2
(45) Date of Patent: Feb. 9, 2016

(54) USING AN ENTERPRISE MESSAGING BUS TO INFLUENCE THE PROCESS OF SOFTWARE COMPILATION AND PACKAGING

(75) Inventor: Jesse Keating, Tacoma, WA (US)

(73) Assignee: Red Hat, Inc., Raleigh, NC (US)

( * ) Notice: Subject to any disclaimer, the term of this patent is extended or adjusted under 35 U.S.C. 154(b) by 1273 days.

(21) Appl. No.: 12/648,285

(22) Filed: Dec. 28, 2009

(65) Prior Publication Data

US 2011/0161929 A1   Jun. 30, 2011

(51) Int. Cl.
*G06F 9/44* (2006.01)
*G06F 9/455* (2006.01)
*G06F 11/30* (2006.01)
*G06F 11/36* (2006.01)
*G06Q 10/10* (2012.01)
*G06F 9/54* (2006.01)

(52) U.S. Cl.
CPC ............. *G06F 9/455* (2013.01); *G06F 9/541* (2013.01); *G06F 9/546* (2013.01); *G06F 11/30* (2013.01); *G06F 11/36* (2013.01); *G06F 11/3672* (2013.01); *G06Q 10/10* (2013.01)

(58) Field of Classification Search
CPC ............. G06F 8/443; G06F 8/40; G06F 9/46; G06F 9/54
USPC .................................................. 717/102–103
See application file for complete search history.

(56) References Cited

U.S. PATENT DOCUMENTS

| | | | |
|---|---|---|---|
| 2005/0060610 A1* | 3/2005 | Leary et al. | 714/25 |
| 2009/0106730 A1* | 4/2009 | Mockford | 717/101 |
| 2010/0037035 A1* | 2/2010 | Archer et al. | 712/28 |
| 2010/0080148 A1* | 4/2010 | Hulse et al. | 370/257 |
| 2011/0145320 A1* | 6/2011 | Megginson | 709/203 |

OTHER PUBLICATIONS

O'Hara, "Toward a Commodity Enterprise Middleware", May/Jun., ACM Queue , p. 48-55.*
Riet, "AMQP specification", Dec. 15, 2006, p. 1-139.*
O'Hara, "Toward a Commodity Enterprise Middleware", May/Jun. 2007, ACM Queue, p. 48-55.*
http://www.amqp.org/confluence/display/AMQP/Advanced+Message+Queuing+Protocol, Advanced Message Queuing Protocol, 2 pgs. Dec. 28, 2009.

* cited by examiner

Primary Examiner — Duy Khuong Nguyen
(74) Attorney, Agent, or Firm — Lowenstein Sandler LLP (57) ABSTRACT

A build system executes a build process using an enterprise messaging bus, a plurality of services, and a plurality of shims, where each of the services do not natively communicate with the enterprise messaging bus. A shim processes a message between a service and an enterprise message bus. The shim further communicates the processed message between the service and the enterprise message bus. The shim includes a receive shim that receives messages from the enterprise message bus, converts the received message into a format native to the service, and forwards the converted message to the service. The shim also includes a transmit shim that receives messages from the service, converts the received message into a format native to the enterprise message bus, and forwards the converted message to the enterprise message bus.

20 Claims, 7 Drawing Sheets

USING AN ENTERPRISE MESSAGING BUS TO INFLUENCE THE PROCESS OF SOFTWARE COMPILATION AND PACKAGING

TECHNICAL FIELD

Embodiments of the present invention relate to a method and system for processing messages in a messaging bus. Specifically, embodiments of the invention relate to using an enterprise messaging bus to automatically influence the process of building, tagging, and providing notifications of software compilation and packaging for use buy a collaborative project.

BACKGROUND

Developing and packaging software can involve the use of several different services. For example, developers will use a version control service to manage the changes in the software during the software development process. In addition a quality assurance service can be used to test the developed software. A build service is used to build various versions of the software. In addition, a bug tracking service to used to track the reporting and fixing of software bugs. Furthermore, the software development can also use reporting and notification services to report and notify messages to recipients.

However, these services tend not to integrated so that automated process cannot be built using these different services. One problem is that the various services do not have a common native format of communication.

DETAILED DESCRIPTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

A build system executes a build process using an enterprise messaging bus, a plurality of services, and a plurality of shims, where each of the services do not natively communicate with the enterprise messaging bus. A shim processes a message between a service and an enterprise message bus. The shim further communicates the processed message between the service and the enterprise message bus. The shim includes a receive shim that receives messages from the enterprise message bus, converts the received message into a format native to the service, and forwards the converted message to the service. The shim also includes a transmit shim that receives messages from the service, converts the received message into a format native to the enterprise message bus, and forwards the converted message to the enterprise message bus.

Figure 1:
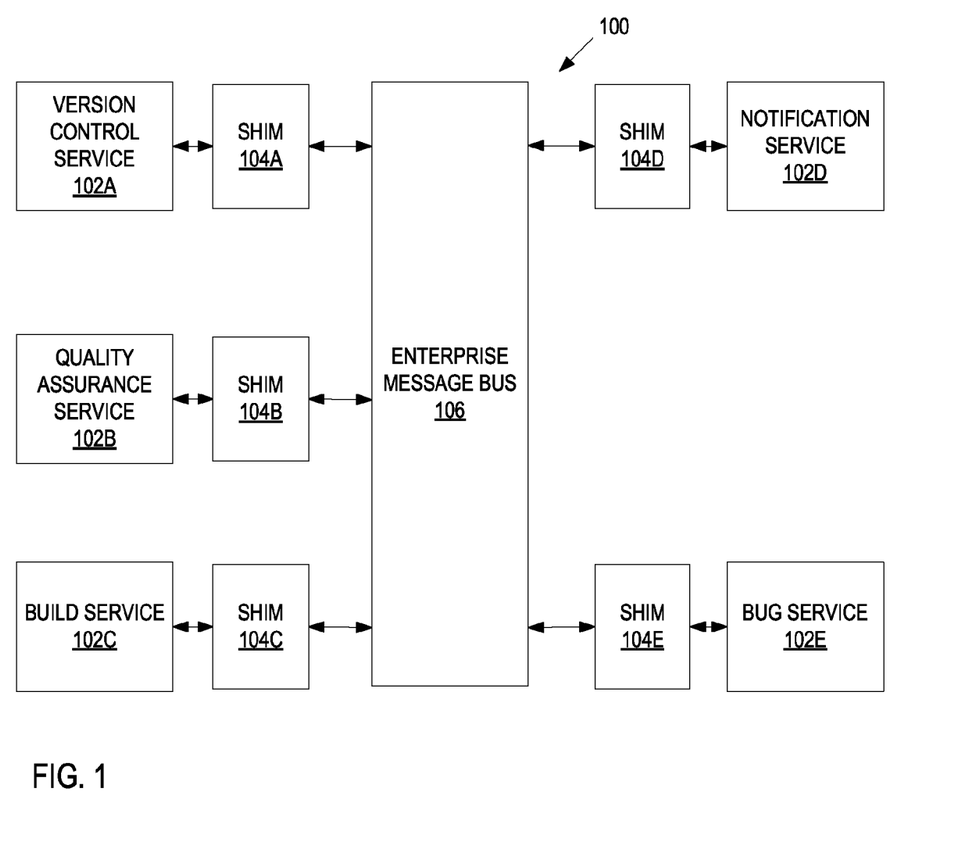
FIG. 1 is a block diagram of one embodiment of a build system using an enterprise messaging bus that couples different services through service specific shims.

FIG. 1 is a block diagram of one embodiment of a build system 100 that uses an enterprise messaging bus 106 that couples different services 102A-E through service specific shims 104A-E. In FIG. 1, build system 100 includes services 102A-E communicating with an enterprise messaging bus 106 through shims 104A-E. The enterprise messaging bus 106 is one of the enterprise messaging buses as known in the art (Apache Qpid, Apache ActiveMQ, HornetQ, Enterprise Service Bus messaging, etc., or other messaging buses known in the art). In one embodiment, Apache Qpid uses advanced messaging queuing protocol (AMQP). Shims 104A-E couple the services 102A-E to the enterprise messaging bus 106. In this embodiment, services 102A-E do not have the capability to communicate directly with enterprise messaging bus 106. Shims 104A-E allow these services 102A-E to communicate with the enterprise message bus 106 without the services 102A-E themselves being changed. In one embodiment, shims 104A-E are additional pieces of software written a software language as known in the art (e.g., Java, C, PERL, Python, scripting languages, etc.).

In one embodiment, these different services 102A-E are generally standalone services and communicate with other people, groups, and/or services (in a specific format and communication means native to that service. For example in one embodiment, version control service 102A communicates to the users of the version control service 102A via e-mail or command line interface (CLI). Shim 104A is a separate piece of software that allows the version control service 102A to communicate with the enterprise message bus 106. In this embodiment, shim 104A translates the CLI output of version control service 102A into a message suitable for use by enterprise message bus 106. In addition, shim 104A translates message received from the enterprise message bus 106 into a format that can be consumed by the version control service 102A. For example, in one embodiment, the enterprise message bus 106 carries a message to check-in an attached source code file into the version control repository maintained by the version control service 102A. Shim 104A would receive this message, convert it into a separate source code file and a CLI command to check-in the file. The shim 104A would execute the CLI command to check-in the source code file. In response, the version control service 102A would output a message regarding the check-in, which the shim 104A would translate the output into the format for enterprise message bus 106.

In one embodiment, the enterprise message bus is Apache Qpid which implements a Java message service. In this embodiment, the enterprise message bus format includes a source and a destination for the message as well as a message content formatted in as a Java object. Thus, the enterprise message bus 106 facilitates the communication of Java objects among the different services 102A-E. In one embodiment, the enterprise message bus 106 includes a broker that forwards received message to the appropriate shim 102A-E. For example, in one embodiment, the broker extracts the destination from an enterprise message and forwards that message to the appropriate service 102A-E. While in one embodiment the message has a single destination, such as one of the services 102A-E, in alternate embodiments, the message is destined for a message queue that can be used to address more than one of the services 102A-E.

As another example, a quality assurance service 102B executes and evaluates a set of tests on specific versions of software. In this embodiment, the quality assurance service 102B configures a test bed to load the software onto the test bed, runs the tests and evaluates the results. In one embodiment, the input to the QA service 102B would be a configuration file indicating the tests to run, the software to run (name, version number, etc.), how to evaluate the results, and/or who to be notified. In addition, the input can also include a CLI command to initiate the tests. In addition, the output of the QA service is the results of the tests and possibly a report of the finished tests. Thus, the messages communicated to and from the QA service 102B includes inputs to configure and run the tests and outputs to reports on the completed tests.

Similar to shim 104A described above, shim 104B is a separate piece of software that allows the QA service 102B to communicate with the enterprise message bus 106. In this embodiment, shim 104B translates the output of QA service 102B into a message suitable for use by enterprise message bus 106. In addition, shim 104B translates a message received from the enterprise message bus 106 into a format that can be consumed by the QA service 102B.

For example, in one embodiment, enterprise message bus 106 carries a message to initiate tests for a particular version of software using QA service 102B. Shim 104B would receive this message, convert it into configuration file and a CLI command to initiate the tests. The shim 104B would execute the CLI command to initiate the tests. In response, the QA service 102B would output the test results on the command line, file, etc. Shim 104B would translate the test results into the format for enterprise message bus 106 and forward these results onto the enterprise message bus 106. In order to forward the test results, shim 104 inserts the appropriate destination into the converted message. For example, in one embodiment, the shim 104B addresses the message to an email recipient, notification group, archival service, webpage, etc.

In one embodiment, another service that can take advantage of a shim to communicate with the enterprise message bus 106 is a build service 102C. In this embodiment, the build service 102C builds software from a snapshot of the software maintained in the version control service 102A. For example, in one embodiment, the enterprise message bus 106 carries a message to build a particular snapshot of software. The build service shim 104C would receive this message, convert it into native input for the build service 102C and initiate the build. In response the build service 102C would output the results via CLI, e-mail, webpage, etc. The input to the build service 102C is a CLI command that can be to tag the current software, build the software using a particular tag, mark completed builds as belonging to a particular collection, etc. In addition, the build input can be from a QA system that influences which collections a build would belong to. The output of the build software is a report of the results of the building, tagging, etc.

Similar to shim 104A described above, shim 104C is a separate piece of software that allows the build service 102C to communicate with the enterprise message bus 106. In this embodiment, shim 104C translates the output of build service 102C into a message suitable for use by enterprise message bus 106. In addition, shim 104C translates message received from the enterprise message bus 106 into a format that can be consumed by the build service 102C.

For example, in one embodiment, enterprise message bus 106 carries a message to initiate a build of software using build service 102C. Shim 104C would receive this message, convert it into a CLI command to initiate the build action (build the software, tag the software, etc.). The shim 104C would execute the CLI command to initiate the build action. In response, the build service 102C would output the build results on the command line (or other form of output). Shim 104C would translate the build results into the format for enterprise message bus 106 and forward these results onto the enterprise message bus 106. In order to forward the test results, shim 104C inserts the appropriate destination into the converted message. For example, in one embodiment, the shim 104B addresses the message to an email recipient, notification group, archival service, webpage, etc.

Notification service 102D is a service that are used to notify/report messages to people, groups, entities, etc. For example, in one embodiment, notification service 102D receives and transmits notifications to other entities, such as people, groups, archival services, etc., using different means (email, short message service, voice mail, micro-blogging messages, log entries, blog entries, web page postings, etc.). In one embodiment, the notification service 102D can be use to notify various recipients of the results of a requested service (e.g., 102A-C and/or 102E).

In this embodiment, shim 104D translates the messages for notification service 102D. For example, in one embodiment, shim 104D receives messages from other services (e.g., services 102-C and/or 102E), converts these messages into a format native to the notification service 102D, and forwards the messages to the notification service 102D so the notification service can forward these converted messages to the proper recipient identified in the converted message.

In addition to the other services discussed, bug service 102E is a service that tracks known bugs for the software. For example, in one embodiment, a bug service 102E is designed to assist QA people and software developers keep track of reported software bugs. Inputs to a bug tracking system include reporting a new bug, updating an existing bug, and/or closing an existing bug. Native formats for the bug tracking system can be email, CLI commands, text based input files, webpages, etc. Outputs from a bug tracking system can include reporting of the opening of a new bug, updating a new bug, bug status reports, and/or closing of a bug, in a native format of email, CLI output, text based logs, etc.

The shim 104E corresponding to bus service 102E converts messages from the enterprise message bus 106 into an input format supported by bug service 104E. Shim 104E forwards the converted message to bug service 104E, where bug service 102E can consume the converted message. In addition, bug service 102E outputs a message that includes results from a bug service action (e.g., creating, updating, reporting, closing one and/or more bugs, etc.). Shim 104E receives the created output from bug service 104E, converts this message, and forwards the message onto the enterprise message bus 106.

In the structure described above, the use of shims 104A-E allows services 102A-E to communicate with each other and other services/entities through the enterprise message bus 106. Furthermore, because the shims 104A-E communicate with the services 102A-E in the services 102A-E native format, these shims 104A-E allow the services 102A-E to couple to the enterprise message bus without requiring a change to the services 102A-E.

By coupling the services 102A-E together with the enterprise message bus 106 through shims 104A-E, the services 102A-E can be combined to provide different services. Furthermore, this framework provides a mechanism to grow the infrastructure. For example, in one embodiment, the input/output interfaces of the services 102A-C and 102E can be extended by using the notification service 102D with services 102A-C and 102E. In this embodiment, the output of services 102A-C and 102E can be extended to use the notification means (e.g., email, SMS, etc.) through the use of the shims 102D for the notification to enterprise message bus 106 and corresponding service shims 102A-C and 102E.

In addition to coupling notification service 1002F to the other services 102A-C and 10F, by coupling services 102A-E together using the enterprise message bus 106, more complicated automated services can be developed. For example, in one embodiment, services 102A-E can be coupled together to provide automated build and test services for software. In this embodiment, build service 102C uses the enterprise message bus 106 to extract a snapshot of the software from the version control service 1102A. Build service 102C builds the software and sends a message to the QA service 102B that the build is complete. QA service 102B receives the message that the software build is complete and initiates a set on tests of the newly built software. The QA service 102B runs the tests on the software and analyzes the results. In one embodiment, if the results reveal any problems in the software (e.g., identifies new bugs), QA services 102B sends messages to bug service 102E to open new bug reports based on the recently run tests via the enterprise message bus 106. Bug service 102E receives the messages from the QA services 102B and opens new bug reports. Bug service 102E additionally messages to the notification service 102D indicating that new bug reports have been opened. Alternatively, QA service 102B could determine that known bugs have been fixed and sends messages to bug service 102E that these bug fixes have been validated. Bug service 102E would receives these messages, update the bug reports to indicate that those bug fixes have been validated, and send messages to the notification service 102D indicating the validation of the bug fixes.

In addition, in one embodiment, the enterprise message bus 106 can be used to tie together actions between the version control service 102A and build service 102C. In this embodiment, if the build service 102C makes a successful build (e.g., no compilation, link, etc. errors), the build service 102C can send a message to the version control service 102A indicating that the version control service 102A should tag the source code stored in the version control service 102A repository with a tag indicated in the message. In one embodiment, the indicated tag is a hash string.

Figure 2:
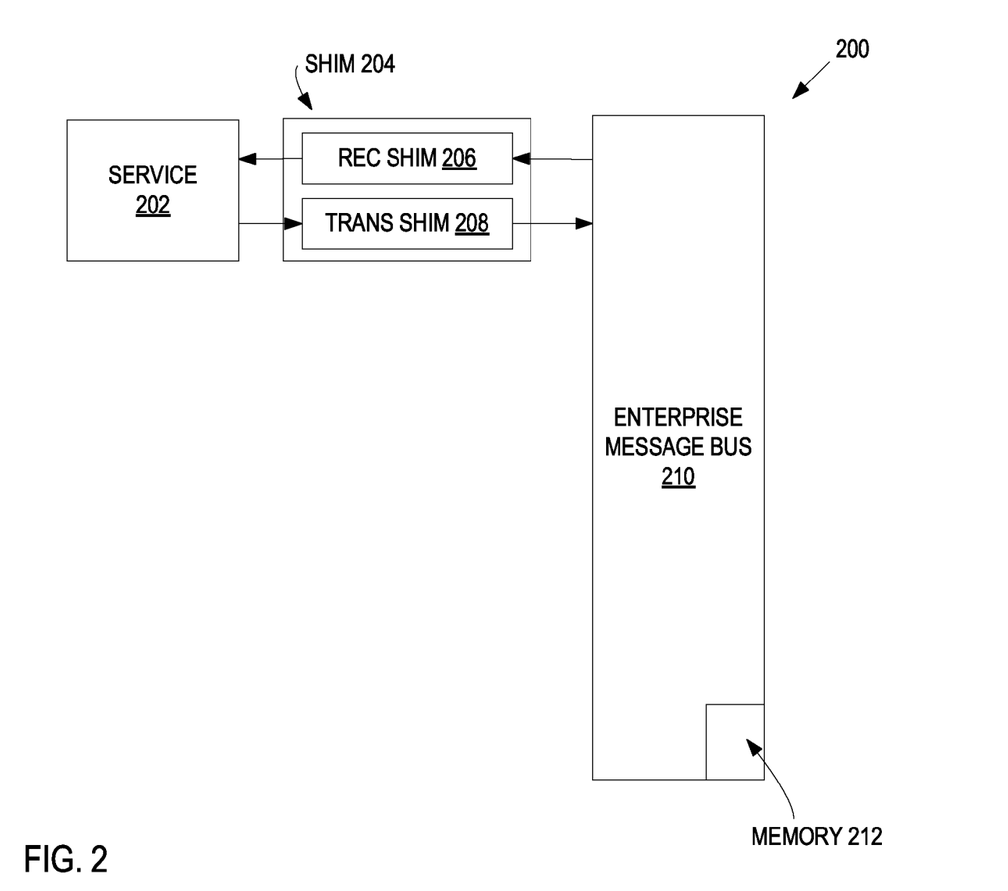
FIG. 2 is a block diagram of one embodiment of a shim coupling a service with an enterprise messaging bus.

FIG. 2 is a block diagram of one embodiment of a shim 204 coupling a service 202 with an enterprise messaging bus 210. In FIG. 2, and in one embodiment, shim 204 includes receive shim 206 and transmit shim 208. The receive shim 206 receives a message in the enterprise message bus 210 native format and translates this received message into a format suitable for service 202. For example, in one embodiment, receive shim 206 receives an enterprise message bus 210 message and converts it into a CLI command plus supporting files for service 202, and forwards the message and file to the service 202. In addition, receive shim 206 can execute the translated CLI command that are used for service 202. For example, in one embodiment, received shim 206 would execute a translated CLI command in order for the service 202 to act upon the contents of the received message.

Furthermore, shim 204 for includes transmit shim 208. Transmit shim 208 receives a message in the native format of service 202 and translates this message into a message suitable for the enterprise message bus 210. For example, in one embodiment, transmit shim 208 receives an e-mail from service 202 and translates this the contents of the e-mail into a format suitable for enterprise message bus 210. Transmit shim 208 forwards this converted message to the enterprise message bus 210. In one embodiment, part of the translation process of transmit shim 208 is to add the proper recipients in the message for the enterprise message bus 210.

Figure 3A:
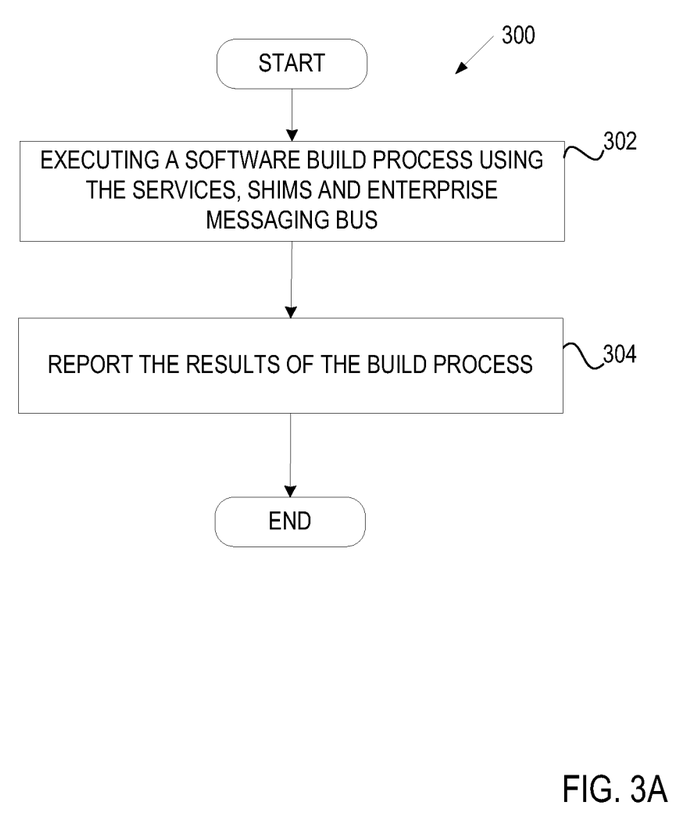
FIG. 3A is a flowchart of one embodiment of a process for executing a software build process.

FIG. 3A is a flowchart of one embodiment of a process 300 for executing a software build process. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a build system, such as build system 100 of FIG. 1.

Referring to FIG. 3A, process 300 begins with processing logic executing a software build process using a plurality of services, a plurality of shims, and an enterprise messaging bus at block 302. In one embodiment, each of the plurality of shims couples one of the plurality of services with the enterprise messaging bus. In this embodiment, messages are passed between different ones of the plurality of services that are used to execute different parts of the build process. While in one embodiment a build process builds the software, in alternate embodiments, a build process can perform alternate actions (mark source code as a collection, tag the source code, test build software, report results, send notifications, initiate a software build, another action known in the art related to building and packaging software, and/or combinations thereof.) For example in one embodiment, a build process is one of the actions described above with reference to FIG. 1. Process 300 reports the results of the build process at block 302.

In one embodiment, process 300 uses the plurality of shims to communicate messages between the plurality of services and the enterprise message bus. Further description shim message communication is described in FIG. 3B below.

Figure 3B:
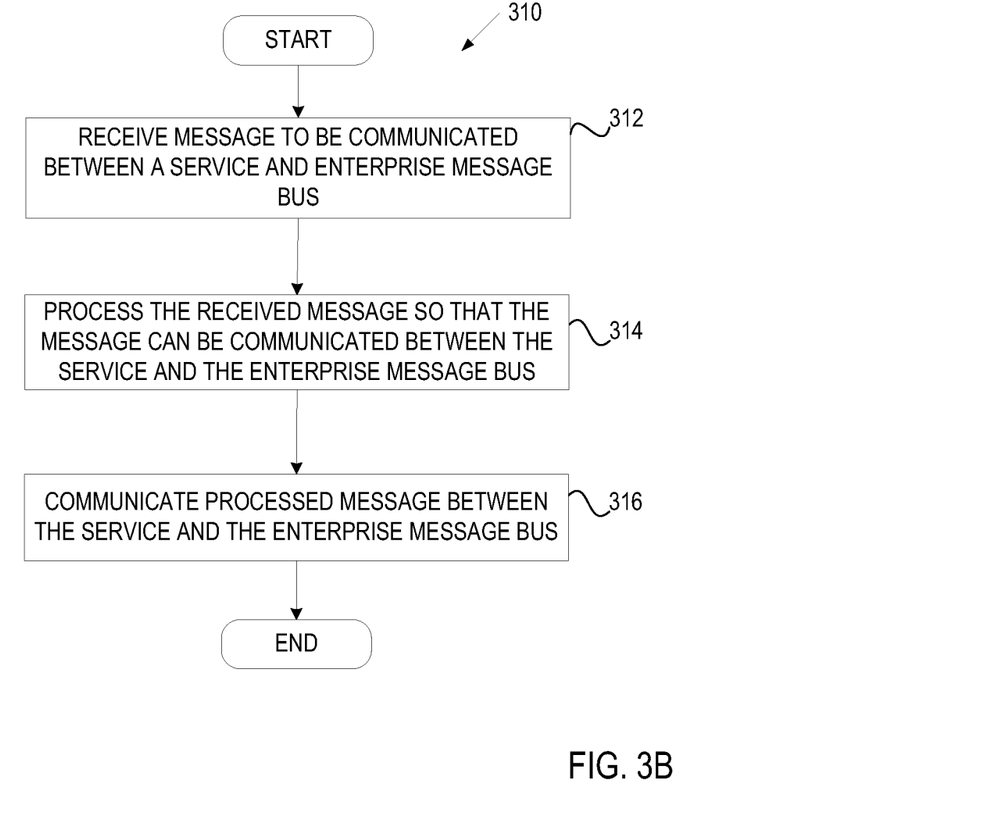
FIG. 3B is a flowchart of one embodiment of a process for processing messages to be communicated between a service and an enterprise messaging bus.

FIG. 3B is a flowchart of one embodiment of a process 310 for processing messages to be communicated between a service and an enterprise messaging bus. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 310 is performed by a shim for a service, such as shim 204 of FIG. 2.

Referring to FIG. 3B, process 310 begins with processing logic receiving a message to be communicated between a service and an enterprise message bus at block 312. In one embodiment, process 310 receives a message from one of the services coupled to the enterprise message bus. In an alternate embodiment, process 310 receives a message from the enterprise message bus destined for a service.

At block 314, process 310 processes the received message so that message can be communicated between the service and enterprise message bus. In one embodiment, process 310 converts the received message into a format for the enterprise message bus. In another embodiment, process 310 converts the received message to a format native to the service that will receive the message 310. At block 316, process 310 communicates converted message in a manner that is consistent with the receiving entity. Blocks 314 and 316 further described in FIG. 4 below.

Figure 4:
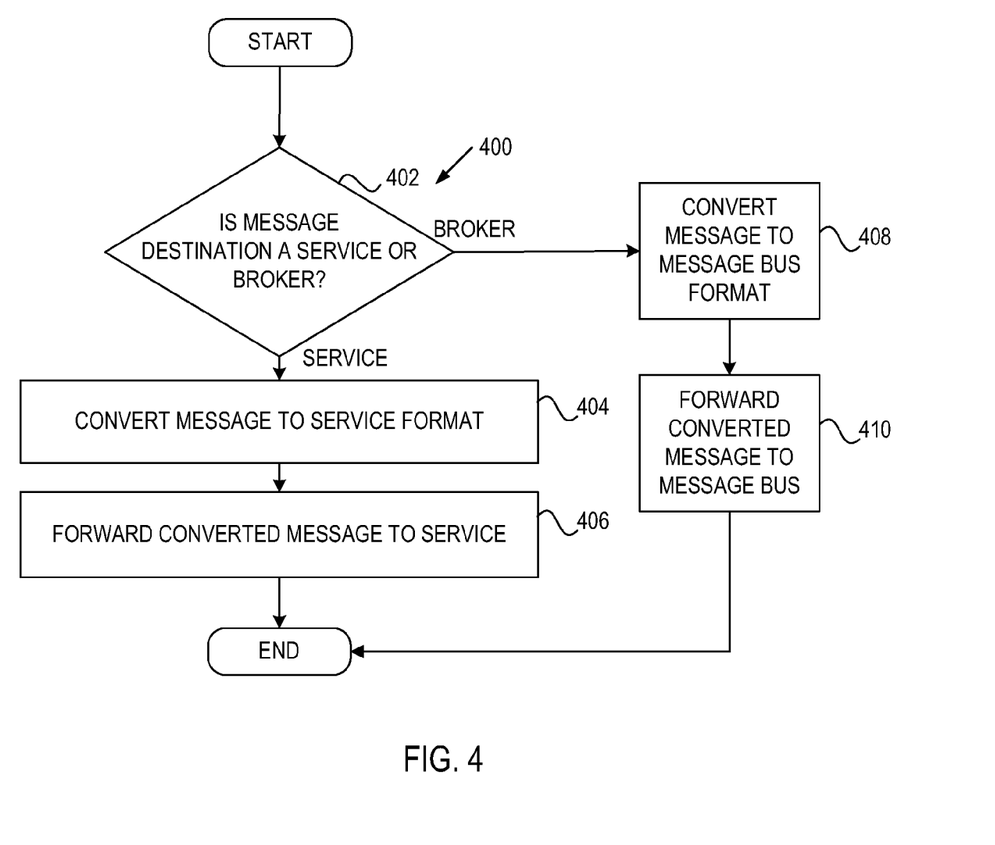
FIG. 4 is a flowchart of one embodiment of a process for converting messages between a service and an enterprise messaging bus.

FIG. 4 is a flowchart of one embodiment of a process 400 for converting messages between a service and an enterprise messaging bus. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by a shim for a service, such as shim 204 of FIG. 2.

Referring to FIG. 4, process 400 begins with processing logic determining if the destination of the received message is for a service or an enterprise message bus broker at block 402. For example, in one embodiment, process 400 examines the format of the message. If the format is an enterprise message format, process 400 determines that the message is destined for the enterprise message bus broker. Alternatively, if the message format is one native to the service (email, CLI command, XML, etc.), process 400 determines that the message is destined for the service.

If the message is destined for the service, process 400 converts the message to a format native to the service at block 404. For example, in one embodiment, process 400 converts an enterprise message bus message from the enterprise message bus message format to a format suitable to the destined service. For example in one embodiment, an enterprise message bus message contains information regarding a successful build of software. This message is consumed by the QA service shim and converts the data into a CLI command to initiate automated tests of the built software. At block 406, process 400 forwards the converted message to the service destined for the message. In one embodiment, blocks 404 and 406 are performed by the receive shim 206 of FIG. 2 above.

If the message is destined for the enterprise message bus broker, process 400 converts the message into a format for the enterprise message bus at block 408. For example in one embodiment, a QA service reports that a test was successful. The shim consumes this message and translates it into appropriate format for the enterprise message bus and forwards it on. At block 410, process 400 forwards the converted message to enterprise message bus. In one embodiment, blocks 408 and 410 are performed by the transmit shim 208 for FIG. 2 above.

Figure 5A:
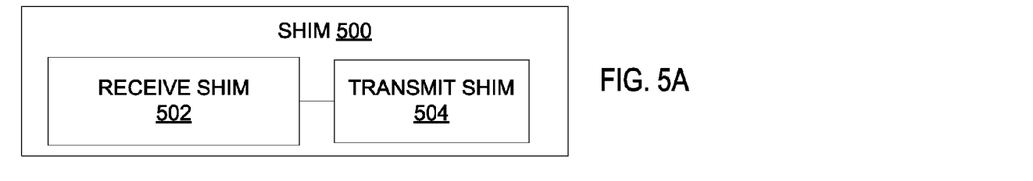
FIG. 5A is a block diagram of a shim that processes messages to be communicated between a service and an enterprise messaging bus.

FIG. 5A is a block diagram of a shim 500 that processes messages to be communicated between a service and an enterprise messaging bus. In one embodiment, shim 500 is one of the shims 104A-E used to converts message between services 102A-E and enterprise message bus 106 as described in FIG. 1 above. Shim 500 includes receive shim 502 and transmit shim 504. Receive shim 502 receives messages from the enterprise message bus and converts the message for the service corresponding to the shim 500 as described in FIG. 4, blocks 404 and 406. Transmit shim 502 receives messages from a service and converts the message for the enterprise message bus as described in FIG. 4, blocks 408 and 410.

Figure 5B:
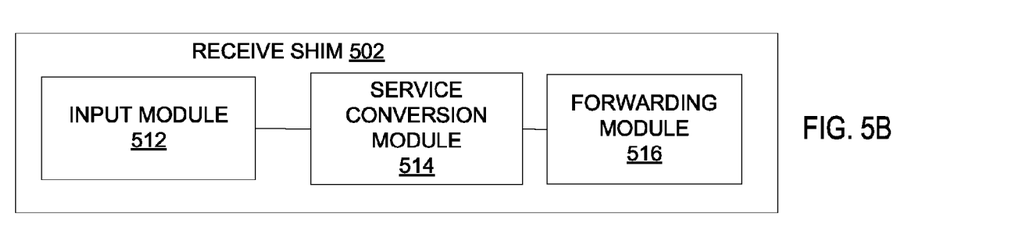
FIG. 5B is a block diagram of a receive shim to convert messages from an enterprise messaging bus format to a format native for the service.

FIG. 5B is a block diagram of a receive shim 502 to convert messages from an enterprise messaging bus format to a format native for the service. In one embodiment, receive shim 502 is the receive shim 206 as described in FIG. 2 above. Receive shim 502 includes input module 512, service conversion module 514, and forwarding module 516. Input module 512 receives an enterprise message bus message as described in FIG. 3B, block 312. Service conversion module 514 converts the enterprise message bus message into a message suitable for a service as described in FIG. 4, block 404. Forwarding module 516 forwards the converted message onto the service as described in FIG. 4, block 406.

Figure 5C:
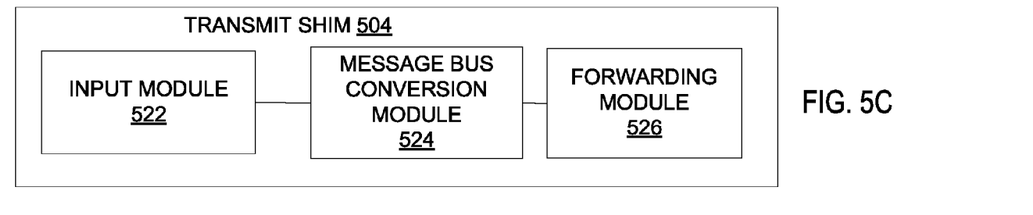
FIG. 5C is a block diagram of a transmit shim to convert messages from a service format to a format native for the enterprise messaging bus.

FIG. 5C is a block diagram of a transmit shim to convert messages from a service format to a format native for the enterprise messaging bus. In one embodiment, transmit shim 504 is the transmit shim 208 as described in FIG. 2 above. Transmit shim 504 includes input module 522, message bus conversion module 524, and forwarding module 526. Input module 522 receives service message as described in FIG. 3B, block 312. Message bus conversion module 524 converts the service message into a message suitable for an enterprise message bus as described in FIG. 4, block 408. Forwarding module 526 forwards the converted message onto the enterprise message bus as described in FIG. 4, block 410.

Figure 6:
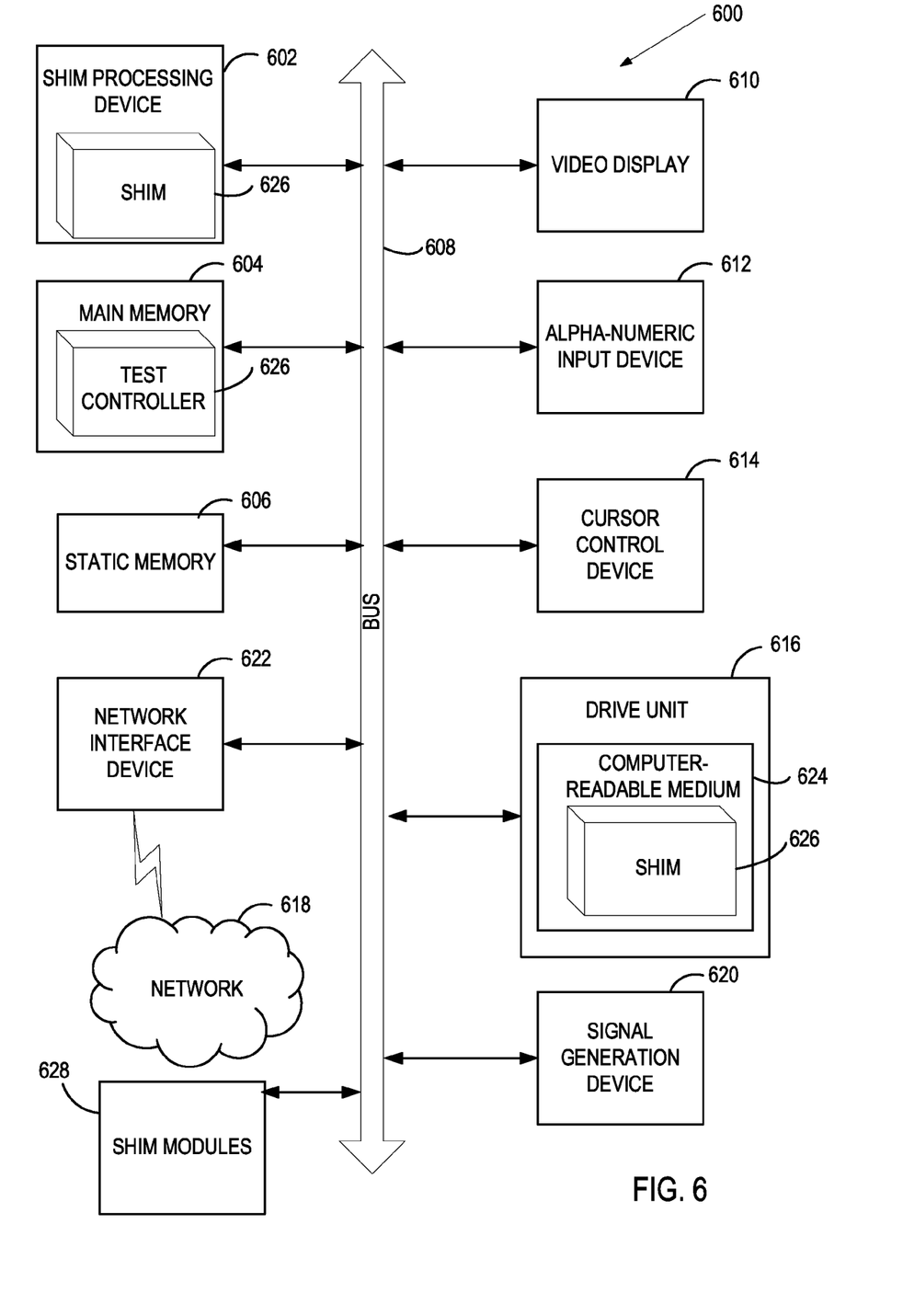
FIG. 6 is a diagram of one embodiment of a computer system that processes messages to be communicated between a service and an enterprise messaging bus.

FIG. 6 is a diagram of one embodiment of a computer system that processes messages to be communicated between a service and an enterprise messaging bus. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., either a client computer or the server computer processing messages between services and an enterprise message bus) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a shim processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Shim processing device 602 represents one or more general-purpose processing devices such as a microprocessor, central processing unit, or the like. More particularly, the shim processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Shim processing device 602 may also be one or more special-purpose processing devices such as an application specific integrated circuit (ASIC), a field programmable gate array (FPGA), a digital signal processor (DSP), network processor, or the like. Shim processing device 602 is configured to execute the shim 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the shim 626) embodying any one or more of the methodologies or functions described herein. The shim 626 may also reside, completely or at least partially, within the main memory 604 and/or within the shim processing device 602 during execution thereof by the computer system 600, the main memory 604 and the shim processing device 602 also constituting machine-readable storage media. The shim 626 may further be transmitted or received over a network 618 via the network interface device 622.

The computer-readable storage medium 624 may also be used to store the shim 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The shim modules 628, components and other features described herein (for example in relation to FIG. 1) can be implemented as discrete hardware components or integrated in the functionality of hardware components such as ASICS, FPGAs, DSPs or similar devices. In addition, the shim modules 628 can be implemented as firmware or functional circuitry within hardware devices. Further, the shim modules 628 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "executing," "reporting," "receiving," "processing," "communicating," "converting," and "forwarding," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for processing messages between a service and an enterprise message bus has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   executing, by a processing device, a software build process using an enterprise messaging bus, a plurality of services, and a shim for a first service of the plurality of services, wherein the first service does not natively communicate with the enterprise messaging bus, and wherein the shim communicates messages between the first service and the enterprise messaging bus by:
   receiving a first message to be communicated between the enterprise messaging bus and the first service, wherein the first service is a software build service;

processing the received first message by:
    inserting a destination into the first message to enable communication of the first message between the first service and the enterprise messaging bus;
    converting the first message into native input for the software build service;
    communicating the converted first message between the first service and the enterprise messaging bus; and
    initiating the software build service;
    receiving a first response to the communicated first message over the enterprise messaging bus;
    executing a second service of the plurality of services using the enterprise messaging bus as part of the software build process;
    combining the first response to the communicated first message with a second response to a communicated second message received from the second service; and
    reporting results of the software build process.

2. The method of claim 1, wherein processing comprises:
    converting the first message to a format native to the first service,
    wherein the destination is not originally part of the first message.

3. The method of claim 1, wherein communicating comprises:
    forwarding the converted first message to the first service.

4. The method of claim 2, wherein the native format is selected from the group consisting of email, command line interface instruction, executable script, and extended markup language.

5. The method of claim 1, wherein processing further comprises:
    converting the first message to a format native to the enterprise messaging bus.

6. The method of claim 5, communicating comprises:
    forwarding the converted first message in the format native to the enterprise messaging bus to the enterprise messaging bus.

7. The method of claim 1, wherein the enterprise messaging bus implements an advanced messaging queuing protocol.

8. The method of claim 1, wherein the plurality of services comprise at least one of quality assurance, source code control, build, bug tracking, or notification.

9. A non-transitory computer readable storage medium having instructions stored thereon that, when executed by a processing device, cause the processing device to:
    execute, by the processing device, a software build process using an enterprise messaging bus, a plurality of services, and a shim for a first service of the plurality of services, wherein the first service does not natively communicate with the enterprise messaging bus, and wherein to communicate messages between the first service and the enterprise messaging bus, the processing device is to execute the shim to:
    receive a first message to be communicated between the enterprise messaging bus and the first service, wherein the first service is a software build service;
    process the received first message to:
        insert a destination into the first message to enable communication of the first message between the first service and the enterprise massaging bus;
        convert the first message into native input for the software build service;
        communicate the converted first message between the first service and the enterprise messaging bus; and
        initiate the software build service;
    receive a first response to the communicated first message over the enterprise messaging bus;
    execute a second service of the plurality of services using the enterprise messaging bus as part of the software build process;
    combine the first response to the communicated first message with a second response to a communicated second message received from the second service; and
    report results of the software build process.

10. The non-transitory computer readable storage medium of claim 9, wherein to processing, the processing device is further to:
    convert the first message to a format native to the first service, wherein the destination is not originally part of the first message.

11. The non-transitory computer readable storage medium of claim 9, wherein to communicate, the processing device is further to:
    forward the converted first message to the first service.

12. The non-transitory computer readable storage medium of claim 10, wherein the native format is selected from the group consisting of email, command line interface instruction, executable script, and extended markup language.

13. The non-transitory computer readable storage medium of claim 9, wherein to process, the processing device is further to:
    convert the first message to a format native to the enterprise messaging bus.

14. The non-transitory computer readable storage medium of claim 13, wherein to communicate, the processing device is further to:
    forward the converted first message in the format native to the enterprise messaging bus to the enterprise messaging bus.

15. The non-transitory computer readable storage medium of claim 9, wherein the enterprise messaging bus is to implement an advanced messaging queuing protocol.

16. The non-transitory computer readable storage medium of claim 9, wherein the plurality of services comprise at least one of quality assurance, source code control, build, bug tracking, reporting, or notification.

17. A system comprising:
    an enterprise messaging bus; and
    a processing device operatively coupled to a memory and the enterprise messaging bus, the processing device to:
        execute a software build process using an enterprise messaging bus, a plurality of services, and a shim for a first service of the plurality of services, wherein the first service does not natively communicate with the enterprise messaging bus, and wherein the shim communicates messages between the first service and the enterprise messaging bus, wherein the processing device is to execute the shim to:
        receive a first message to be communicated between the enterprise messaging bus and the first a service, wherein the first service is a software build service;
        process the received first message to:
            insert a destination into the first message to enable communication of the first message between the first service and the enterprise messaging bus;
            convert the first message into native input for the software build service;

communicate the converted first message between the first service and the enterprise messaging bus, and initiate the software build service;

receive a first response to the communicated first message over the enterprise messaging bus;

execute a second service of the plurality of services using the enterprise messaging bus as part of the software build process;

combine the first response to the communicated first message with a second response to a communicated second message received from the second service; and report results of the software build process.

18. The system of claim 17, wherein the shim comprises:

a receive shim to convert the first message to a format native to the first service and forward the converted first message in the format native to the first service to the first service.

19. The system of claim 18, wherein the native format is selected from the group consisting of email, command line interface instruction, executable script, and extended markup language.

20. The system of claim 17, wherein the shim comprises:

a transmit shim to convert the first message to a format native to the enterprise messaging bus and forward the converted first message native to the enterprise messaging bus to the enterprise messaging bus.

* * * * *